US008285295B2

United States Patent
Westerberg et al.

(10) Patent No.: US 8,285,295 B2
(45) Date of Patent: Oct. 9, 2012

(54) DYNAMIC FREQUENCY BAND ALLOCATION BETWEEN RADIO COMMUNICATION NETWORKS

(75) Inventors: Erik Westerberg, Enskede (SE); Andreas Olsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 735 days.

(21) Appl. No.: 12/522,510

(22) PCT Filed: Jan. 15, 2007

(86) PCT No.: PCT/SE2007/050019
§ 371 (c)(1),
(2), (4) Date: Jul. 8, 2009

(87) PCT Pub. No.: WO2008/088254
PCT Pub. Date: Jul. 24, 2008

(65) Prior Publication Data
US 2010/0248739 A1  Sep. 30, 2010

(51) Int. Cl.
*H04W 72/04* (2009.01)
(52) U.S. Cl. .................................................... 455/450
(58) Field of Classification Search .................. 455/450, 455/436, 437, 426.1, 435.1, 435.2, 453, 69, 455/438, 432.1–433, 552.1–553.1, 439–444, 455/511, 420, 561, 560, 550.1, 516; 370/331, 370/330, 328, 338, 235, 335, 278
See application file for complete search history.

(56) References Cited

U.S. PATENT DOCUMENTS

| | | | |
|---|---|---|---|
| 7,949,343 B2 * | 5/2011 | Kermoal et al. | 455/452.2 |
| 8,060,017 B2 * | 11/2011 | Schlicht et al. | 455/41.2 |
| 8,134,980 B2 * | 3/2012 | Proctor, Jr. | 370/335 |
| 2008/0070510 A1 * | 3/2008 | Doppler et al. | 455/69 |
| 2008/0070586 A1 * | 3/2008 | Kermoal et al. | 455/452.2 |
| 2010/0142446 A1 * | 6/2010 | Schlicht et al. | 370/328 |
| 2010/0142447 A1 * | 6/2010 | Schlicht et al. | 370/328 |
| 2010/0142448 A1 * | 6/2010 | Schlicht et al. | 370/328 |
| 2010/0150120 A1 * | 6/2010 | Schlicht et al. | 370/338 |
| 2011/0077015 A1 * | 3/2011 | Saily et al. | 455/450 |
| 2012/0026974 A1 * | 2/2012 | Fong | 370/331 |
| 2012/0106428 A1 * | 5/2012 | Schlicht et al. | 370/312 |
| 2012/0115518 A1 * | 5/2012 | Zeira et al. | 455/500 |

* cited by examiner

*Primary Examiner* — Melody Mehrpour
(74) *Attorney, Agent, or Firm* — Potomac Patent Group PLLC (57) ABSTRACT

The present invention relates to cellular communications and in particular to a frequency spectrum shared by two cellular networks. The object is flexible utilization of the spectrum. This is achieved by a method wherein a first of the networks occupies part of the shared spectrum in relation to the traffic load in the first network. The first network informs a second of the networks on the extent the shared spectrum is occupied, for the second network to be free to use the shared spectrum outside the occupied part. The invention also relates to a RRM unit arranged for carrying out the inventions, to a BSC and to a radio base station adapted for carrying out the method. One advantage is that spectrum can be lent from an old system when a new system is introduced.

16 Claims, 6 Drawing Sheets

DYNAMIC FREQUENCY BAND ALLOCATION BETWEEN RADIO COMMUNICATION NETWORKS

TECHNICAL FIELD OF THE INVENTION

The present invention relates to cellular radio communications in general and more particular to a method for utilizing a frequency spectrum band shared among two or more radio networks. The invention also relates to a control node for performing the method, to an RRM node, to a base station controller and a radio base station comprising the RRM node.

DESCRIPTION OF RELATED ART

Figure 1:
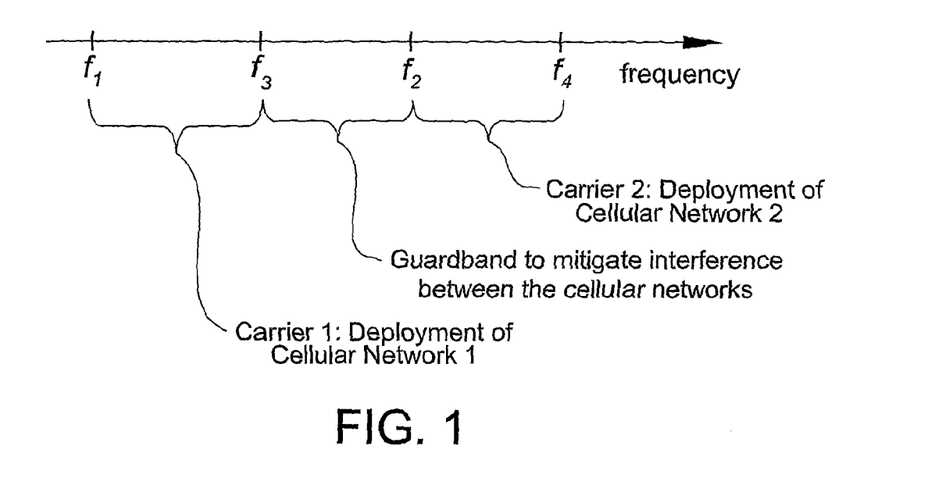
FIG. 1 is a frequency axis illustrating the prior art usage of the spectrum bands.

In traditional planning of cellular networks, a range of contiguous radio frequencies, referred to as a carrier, are allocated in a static fashion to a single radio network. This is illustrated with the frequency axis in FIG. 1, where Carrier 1, ranging from frequency f1 to f3, is allocated to Cellular Network 1 and Carrier 2, that ranges from frequency f2 to f4 is allocated to Cellular Network 2. Between the two carriers, a Guard-Band is typically included in order to reduce the spurious emissions emitted between the cellular networks.

As a consequence of this traditional deployment the traffic belonging to cellular network 1 is kept entirely in carrier 1 and the traffic belonging to cellular network 2 is kept entirely in carrier 2.

Since there is no overlap between the two carriers decisions about the scheduling of data on carrier 1 can be taken by cellular network 1 without any information about the scheduling of cellular network 2 and vice versa. One example of the above is where cellular network 1 is a GSM network belonging to operator A and cellular network 2 is a GSM network belonging to operator B. Another example will be when cellular network 1 is a GSM network and network 2 is an LTE network and the two networks 1 and 2 belong to the same operator. This is illustrated in the time/frequency axis of FIG. 2.

Operators will need an increased flexibility in their cellular deployments in the coming years for several reasons:
- An increased number of cellular technologies are available
- The need to migrate spectrum from their currently deployed cellular technology (e.g. GSM) to more modern cellular technology (e.g. LTE).
- Shortage of spectrum will certainly be a problem for some operators, it is often expensive to get access to.
- A general trend of "technology agnosticism" from regulators, whereby the allocation of frequency bands to operators does not prescribe the usage of any particular technology.

SUMMARY OF THE INVENTION

The object of the present invention is flexible utilization of a spectrum by two networks.

In the first radio network an RRM unit control the radio resource management in one or more cell, and in the second network a second RRM unit controls the radio resource management in one or more cell. The basic concept of the invention is to occupy part of a spectrum for use in the one or more cell/s controlled by the first RRM unit in relation to the traffic load in the cell/s controlled by the first RRM unit. The second RRM unit is informed of the occupied part of the shared spectrum, and is free to use the shared spectrum outside the occupied part.

The invention also relates to a first RRM unit with an interface for connection to the second RRM unit, and that has means for performing the method.

The invention further relates to a base station controller, and a radio base station including the RRM unit.

An advantage with the invention method is a superior utilization of the shared spectrum.

In particular it is an advantage when a new network based on new technology is introduced. The frequency band dedicated to the new network may be too narrow to allow for the highest bitrates affordable by the technology itself. The frequencies of the shared spectrum then make the highest bitrates possible.

A further advantage exampled by the GSM and LTE networks is that that the average bitrates in the LTE system, as seen by the end-user, are substantially higher than they would be if LTE was confined to a part of the spectrum that is dedicated to the LTE-network only.

Yet another advantage of the invention is a radio network that is shared between two different network operators. In this embodiment two operators may share one RBS. At least one part of the spectrum in which the RBS operates its radio communication is then shared between the two operators so that the RBS can use the shared part of the spectrum either for radio communication to mobile stations attached to the first network operator or for radio communication attached to the second network operator.

DESCRIPTION OF PREFERRED EMBODIMENTS

Figure 2:
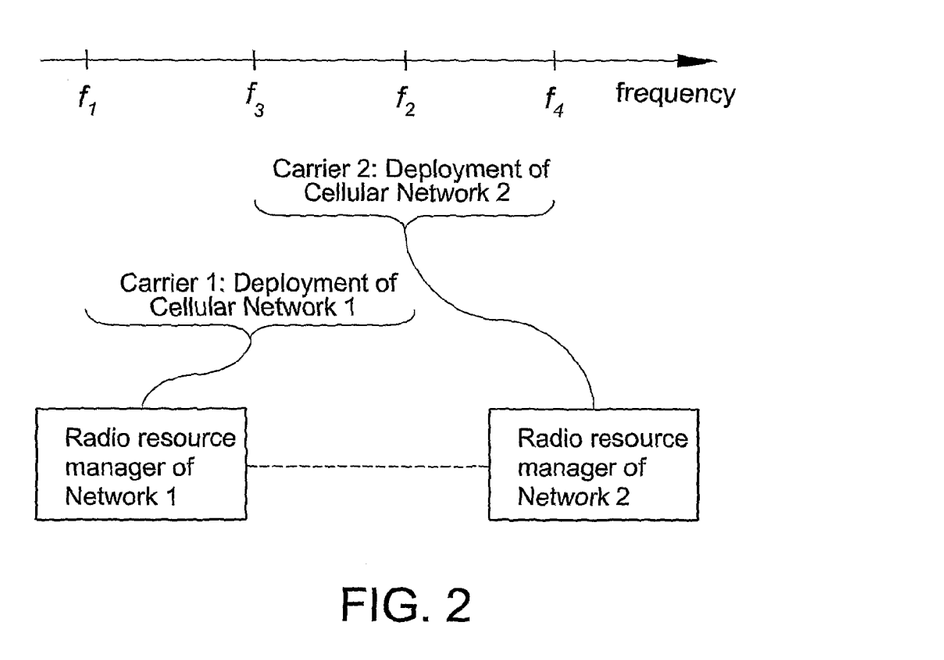
FIG. 2 is the same as FIG. 1, except for illustrating an inventive usage of spectrum.

The invention is based on a frequency band being divided into tree part, as is depicted by the frequency axis in FIG. 2. The frequency band f1-f2 is allocated to a first network, the frequency band from f3-f4 is allocated to a second network, albeit part f3-f2 of the allocated bands are shared by both networks and the first network has only a part f1-f3 of carrier dedicated for its own and the second network only part f2-f4 of carrier dedicated. In the lower part of FIG. 2 the respective RRM (Radio Resource Manager) of the networks are marked by boxes. The RRM control the usage of the spectrum and are connected for communicating the usage of the shared spectrum between each other.

The core of the invention is the exchange of information messages between the first and the second network which allows each system to know which part of the shared spectrum that is eligible for traffic scheduling. These information messages can be either proprietary or standardized.

Figure 3:
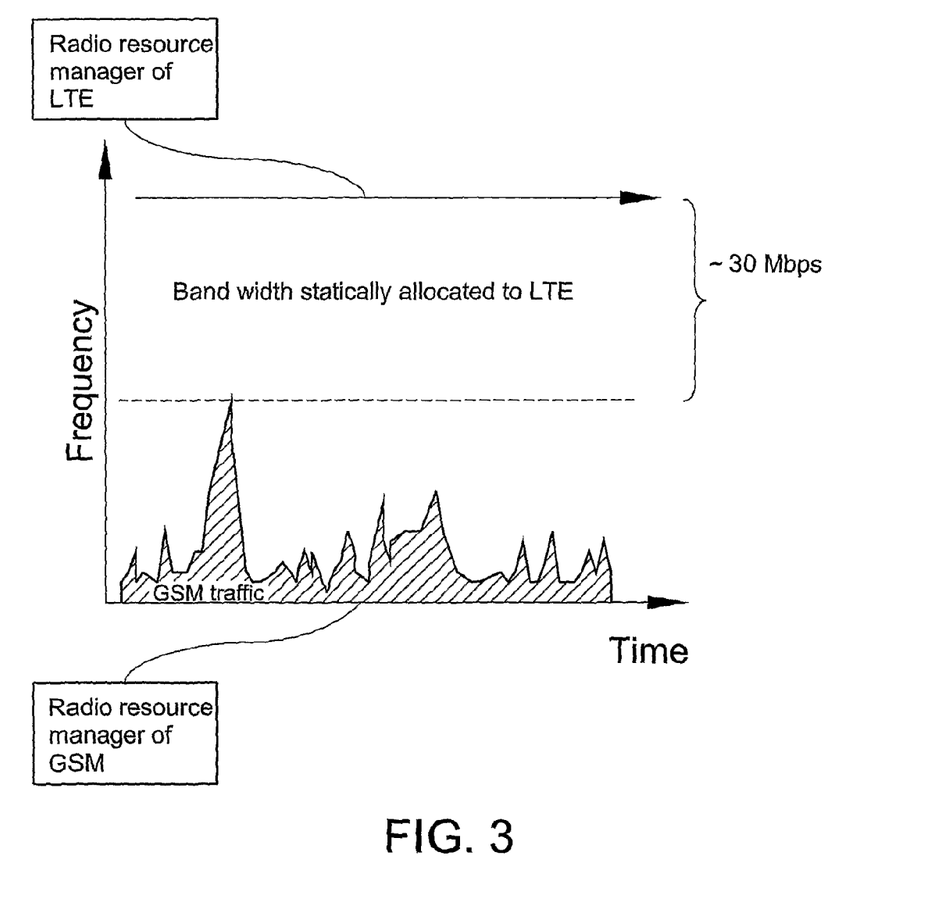
FIG. 3 is a time/frequency diagram illustrating spectrum utilization of two separate bands by a GSM and an LTE network.
Figure 4:
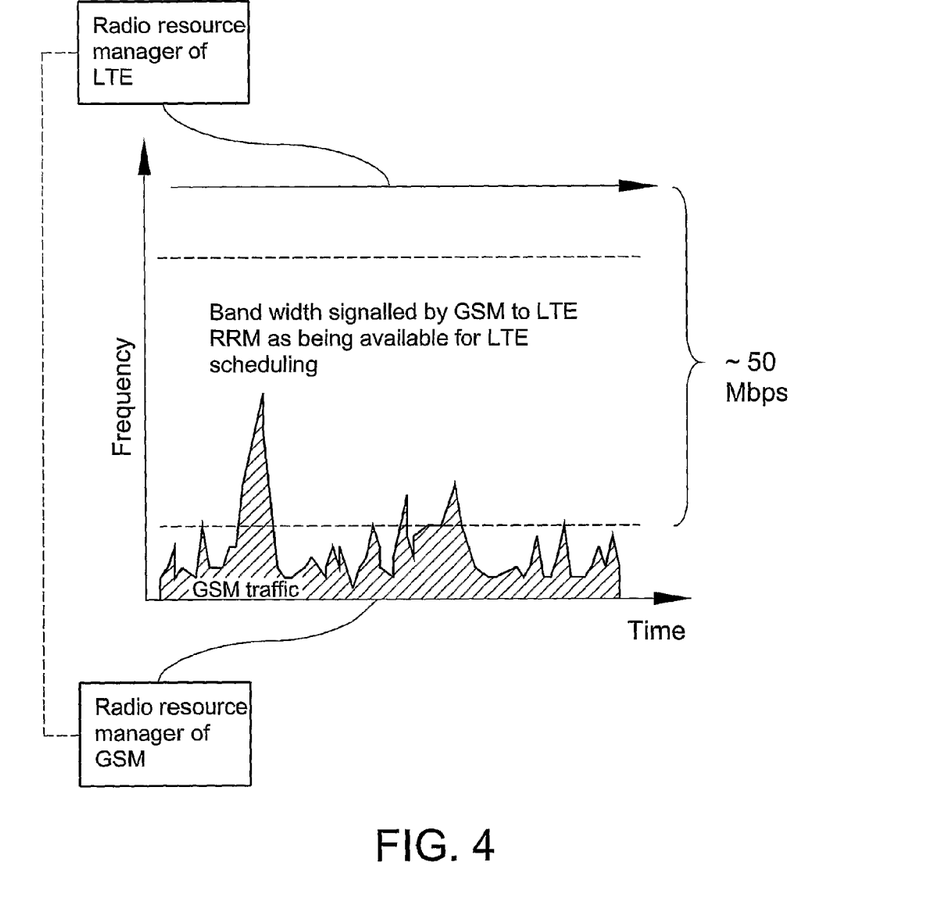
FIG. 4 is the same as FIG. 2, whereas illustrating an alternative spectrum utilization.

The advantage of the spectrum allocation can be understood by comparison of FIG. 3 that discloses prior art allocation a spectrum to a GSM and an LTE net, and its usage by the GSM traffic in a time/frequency diagram, with the spectrum allocation and usage in FIG. 4, illustrating the inventive allocation to the nets in the same type of diagram. To maintain an acceptable grade of service, i.e. a low blocking rate, the operator is forced to allocate bandwidth to GSM for traffic peaks to be handled within the spectrum allocation. With static spectrum allocation, as in the prior art, this limits the bandwidth allocation to LTE. By sharing part of the spectrum the LTE system can get access to it, and get a large part of it, during the time periods when the traffic in GSM is low or medium. Thereby the LTE can offer a substantially larger capacity and peak rate.

First Embodiment

The inventions primary application is for scenarios where both networks belong to the same operator.

Figure 5:
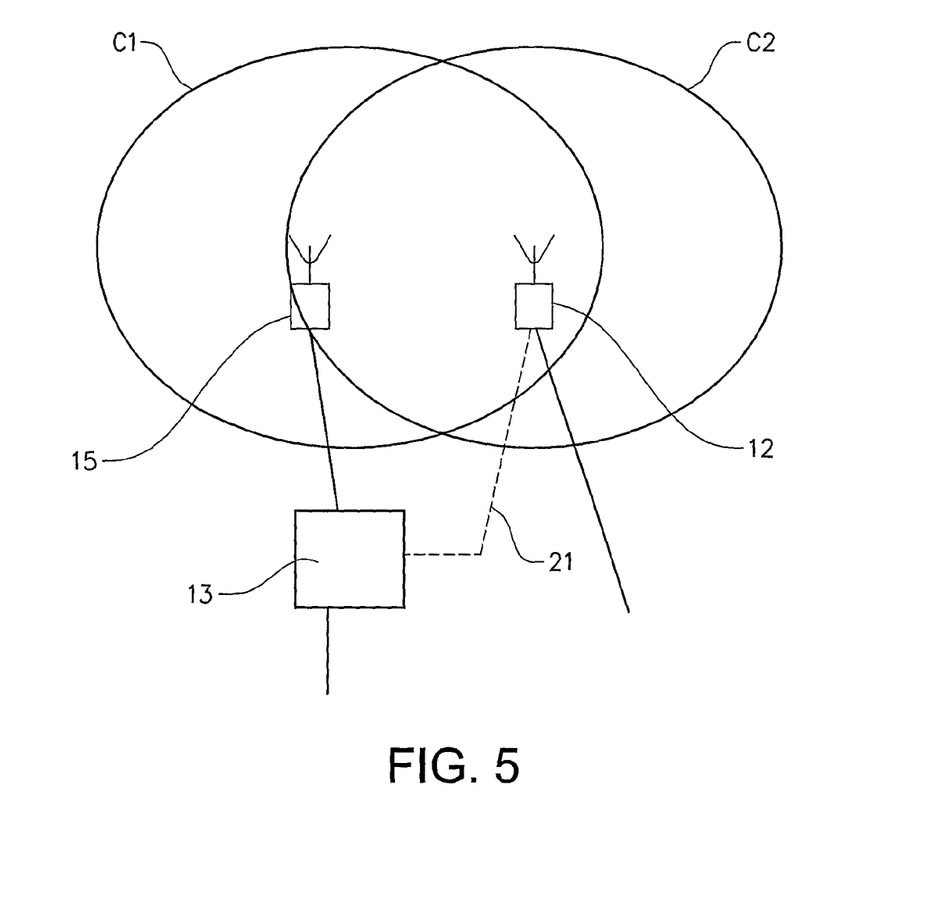
FIG. 5, is a view of some nodes, and cells of two networks.

FIG. 5, is a view of a first cell C1 in a GSM system and a second cell C2 in an LTE system. The first cell C1 is served by radio base station 15 in the GSM system, i.e. a GSM BTS, 15, and the second cell C2 is served by an LTE RBS 12 (radio base station). The GSM BTS, 5, is connected to a GSM BSC (Base Station Controller) 13. The GSM BSC, 13, and the LTE RBS, 12, have links for data communication via a core network. For this invention the links are not important. Important is instead, a new link connecting the GSM BSC, 13, with the LTE RBS 12, and that will be described further down.

Of course GSM and LTE networks comprise numerous cells and base stations 15, 12. FIG. 5 is for illustrative purposes of two networks, controlled by the same operator, sharing part of spectrum and having at least some cells with overlapping geographical coverage as is the case with the first and the second cell C1, C2. This complicates the interference situation.

Figure 6:
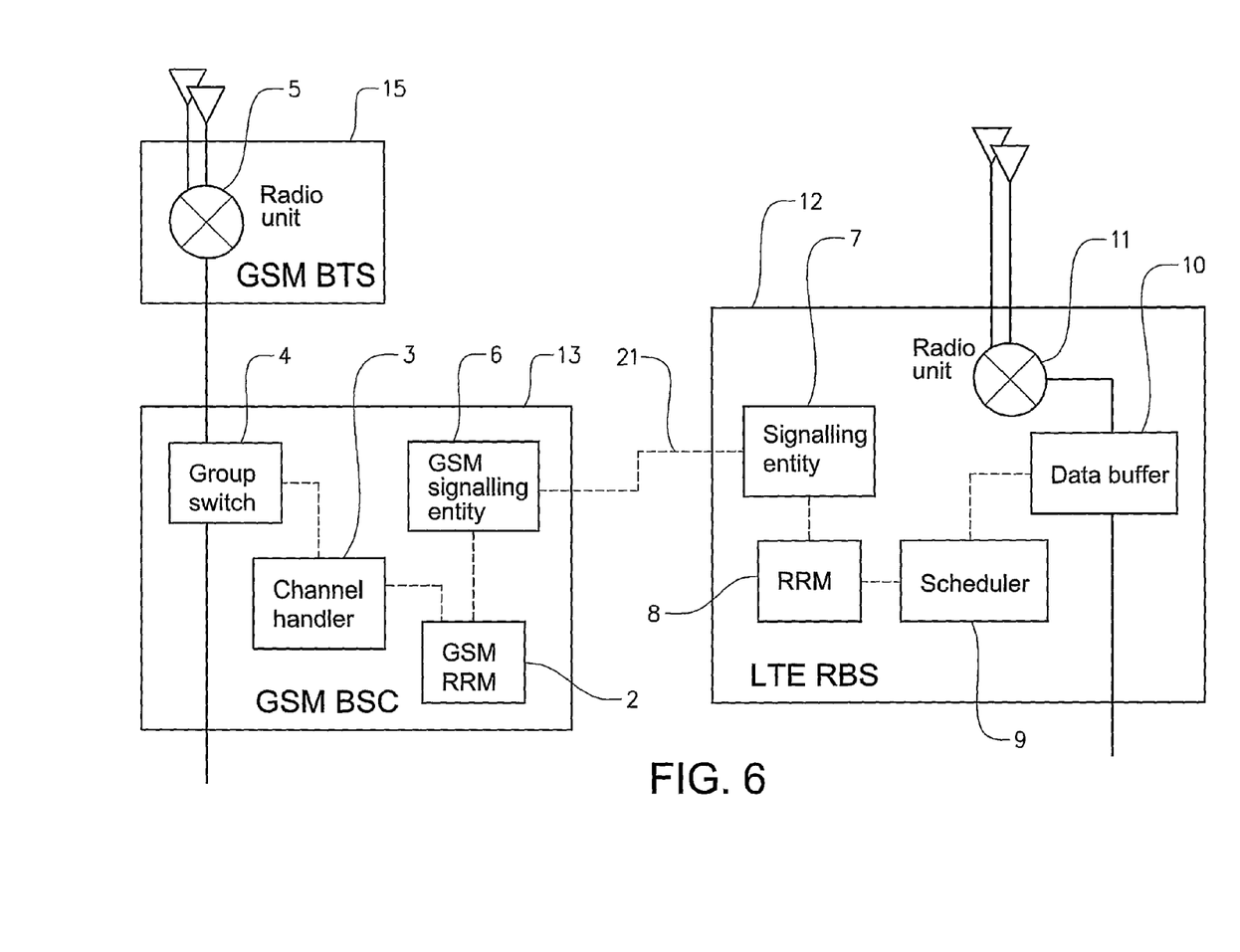
FIG. 6 is a block diagram of nodes in a GSM and an LTE system.

FIG. 6 is a block diagram, illustrating functional blocks of the GMS BTS 5, the GSM BSC, 13, and the LTE RBS, 12 that are essential for the invention.

The functional blocks in the GSM BSC, 13, are the GSM radio resource manager 2, the Channel handler 3, the group switch 4 and the signaling entity 6 that communicates with the LTE system via the LTE signaling entity 7. The GSM BTS, 5, includes the important modules Radio unit 5 and antennas. The LTE RBS contains the functional blocks Signaling Entity 7, radio resource manager 8, the Scheduler 9, the data buffer 10, the radio unit 11 and the antennas. The functional blocks of the GSM BSC, 13, and LTE RBS, 12, are with exception of the radio unit 11, primarily implemented as software executed by processors. They may however to a various extent be implemented by hardware. The extent is choice of implementation. The functional units, 2-4, 6-11, are typically implemented in separate physical program and processors, however some of the functional units may share physical entity.

In the first embodiment the GSM system has priority in the shared spectrum but lets the LTE system know, by means of the information elements sent between from the GSM RRM, 2, to the LTE RBS RMM, 8, which parts of the shared spectrum are used by GSM and when. The LTE system would then maintain up to date information about which part of the shared spectrum is presently occupied by GSM and schedule LTE data in the remaining part of the spectrum. This function will be described in more detailed with reference to FIG. 6 and to the steps of a method illustrated by the flowchart of FIG. 7.

The GSM RRM, 2, controls both the spectrum that has been dedicated to GSM only, i.e. the carrier between frequencies f1 and f3 in FIG. 2, and the spectrum that has been allocated to both GSM and LTE, i.e. the shared spectrum between frequencies f3 and f2 in FIG. 2.

Figure 7:
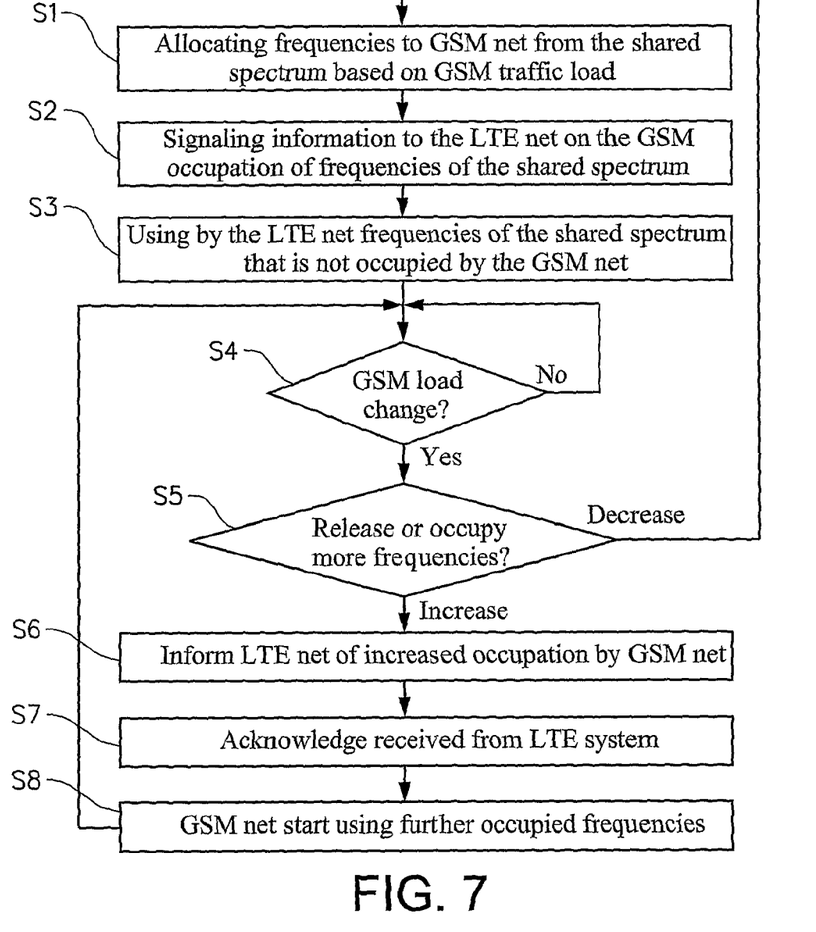
FIG. 7 is a flowchart of the steps of a first method embodiment.

Initially the GSM RRM, 2, takes frequencies from the shared spectrum into use based on the traffic load in the GSM network, see S1 in FIG. 7.

In following step S2, the GSM RRM, 2, signals to the GSM signaling entity, 6, what frequencies in the shared carrier are presently in use by the GSM radio network. The GSM signaling entity, 6, sends an information element containing this information to the LTE signaling entity which forwards this message to the LTE RRM, 8.

In S3, the LTE RRM, 8, processes the information with other available information about which frequencies to use and sends the resulting radio resource information to the LTE scheduler, 9. In particular the LTE RRM, 8, instructs the scheduler, 9, not to use any of the frequencies in the shared carrier that is presently being occupied by GSM. The LTE scheduler, 9, uses this information in combination with other available data to determine which user data in the data buffer, 10, shall be transmitted to the mobile stations and which resources, such as frequencies, shall be used. In particular the scheduler, 9, uses only the frequencies that are indicated as available by the LTE RRM, 2.

The traffic load of the GSM is monitored, S4, and compared to upper and lover thresholds, S5. This is performed by the GSM RRM, 8.

In case of a decrease in the GSM traffic load, the first step is again entered by the GSM RRM, 2, releasing some of the frequencies occupied by GSM. The steps following on the first step S1 is performed in a loop.

In an alternative step 4 and 5, S4, S5, the channel handler, 3, receives a request for a new voice call to be set up in the GSM cell. The channel handler,3, signals this request to the RRM, 2, which determines traffic load increase.

If step 5, S5, results in a increase of the GSM load, the GSM RRM, 2, in a sixth step S6, identifies a GSM radio channel that can be used and stores information about which frequencies that GSM channel requires. The GSM radio resource manager sends a message to the LTE resource manager. The message contains information about the frequencies that are going to be used for the GSM call and instructs the LTE system to not use these frequencies for scheduling traffic.

The LTE RRM, 8, acknowledges receipt of the information, and the acknowledgement is received by the GSM RRM, 2, the seventh step S7.

Next, see S8, the GSM RRM, 2, grants the channel handler to set up the voice call on the identified frequencies. The channel handler, 3, uses state of the art methods to set up the voice call through the group switch over the abis interface via the GSM BTS, 5, and over the radio interface to the mobile using the radio channel granted to the call by the GSM RRM. In parallel to the voice call set up, the LTE signaling entity, 7, informs the LTE RRM about the frequencies that are from now on used for the GSM voice call. The LTE RRM relays this information to the LTE scheduler which immediately stops all scheduling on the corresponding frequencies.

When the last step is performed the traffic in the GSM system is monitored, see step S4, and the further steps are performed in a loop.

Second Embodiment

Figure 8:
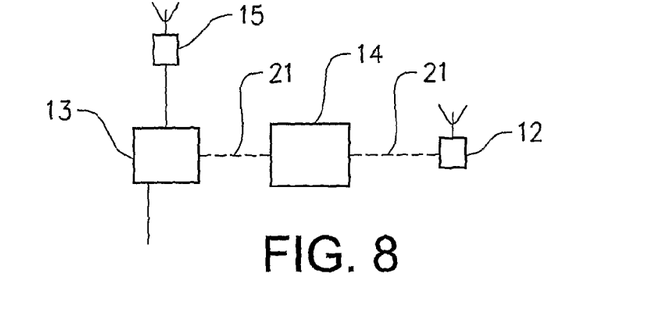
FIG. 8 block diagram of nodes in a GSM and an LTE system and a control node.

FIG. 8 is block diagram, of the same nodes as FIG. 6 with the exception of a control node, 14, external the GSM and LTE network nodes. The control node, 14, has interfaces connecting to the signaling entities, 6, 7 of the GSM BSC, 13, and LTE RBS, 12, via links 21. All the functional units, 2-4, 6-11, of the GSM BSC, 13 and the LTE RBS, 12 are the same as in FIG. 6, albeit the functioning of the RRMs being somewhat different.

In the second embodiment, the GSM is not privileged over the LTE in the access to the shared network. The LTE RRM, 8, monitors the traffic load and if the load cannot be handled within the frequency spectrum already assigned by the control node, 14, the LTE RRM, 8, requests the control node, 14, to assign more of the shared spectrum to the LTE system. The GSM RRM, 2, functions in the same way. The request on spectrum allocation from the LTE and GSM RRM, 2, 8 includes a measure of the respective the traffic load.

When the control node, 14, has received the request to be assigned more of the shared spectrum from the LTE RRM, 8, the control node, 14, request the GSM RRM, 2,to provide a measure of the GSM traffic load. The control node, 14, compares the traffic loads of the GSM and LTE networks.

Based on the information about the load in the GSM and LTE networks respectively, present spectrum allocations and policies as defined by the network operator the control node, 14, decides whether or not the present allocations of the shared spectrum to the GSM RRM function and LTE RRM functions shall be changed. If the decision of the RRM control node, 14, is to re-assign (change) then both the RRM, 2, 8 of the GSM and LTE networks are informed. If the decision is to do no re-assignment, then only the LTE RRM, 8, is informed because it made the request.

Traffic Load Measures and Policy Parameters

The control node, 14, in the second embodiment need to compare the traffic load measures from the LTE and GSM systems. The measures should be processed by the respective RRM, 2, 8, to be comparable. The measures could for example be based on any of the parameters: occupation of available radio channels, packet loss over radio, delays, throughput in either the uplink or downlink direction or any combination of the parameters. Preferably, the measure is quantified in relation to the frequencies already assigned.

The load measures can be either of the form of instantaneous load level, load level as filtered over a well-defined time period which could range from milliseconds to minutes or even hours. Alternatively the load measures could be predictions of the load situation for a future time period.

The load measures could be sent periodically from the RRM units 2 and 8 to the central RRM control function 14. Alternatively the load measures could be sent based on events, e.g. a significant change in the load situation in either of the GSM and LTE system as compared to last reported load measure.

The policy parameters serve the purpose to compare and weigh the importance of the load measures in the decision about how to re/assign spectrum to the RRM units 6 and 8. The policy parameters are either a permanent part of the RRM control unit 14 or provisioned to the RRM control unit 14, e.g. by means of an operation and management system. The policy parameters could e.g. compare two conceptually different load measures such as number of ongoing voice calls in GSM to the channel occupancy of LTE or weigh two comparable measures such as channel occupancy in the two systems. In one embodiment of the invention the policy parameters are used to prioritize one network over the other which in the extreme limit of absolute priority to GSM gives a function similar to embodiment one of the invention discussed in previous sections.

The policy parameter can also be connected to QoS (Quality of service) policies of the individual end-users in the two systems so that spectrum is assigned based on services and individual user priorities.

Further Alternatives to the Embodiments

It should be understood that the RRM, 2, of the GSM system could be connected to plural RRM, 8, in respective LTE RBSs, 12. Thereby, the GSM RRMs, 2, could be connected to a number of LTE RBS, 12, that correspond in number and geographical coverage to a number of GSM BTS, 15, that are controlled by the GSM BSC, 13.

The GSM and LTE networks are examples of networks used in the first and second embodiment. Networks based on other radio access technologies can of course be used in combination with the present invention. For example the invention would be advantageously when migrating from a network based on CDMA technology to a network based on OFDM or any other future access technology. The RRM, 2, or the control node, 14, could further allocate the uplink and the downlink spectrum separately.

Other systems may divide there functional entities differently than that of the GSM, BSC, and give other names to the entities.

The networks sharing a spectrum could also be based on the same access technology. This is in particular the case for the scenario when the control node, 14, assigns the shared spectrum to a network that offers the highest price for access the shared spectrum. Moreover, it could be possible to share a spectrum by more than two networks.

Abbreviations

LTE Long Term Evolution of 3 G as is standardized by 3GPP
OFDM Orthogonal Frequency Division Multiple Access
RBS Radio Base Station
RRM Radio Resource Manager
BTS Base Transceiver Station

The invention claimed is:

1. A method of controlling utilization of a frequency spectrum shared by first and second radio networks that each include one or more radio resource manager (RRM) units for controlling radio resource management in one or more cells, comprising:
    occupying a first part of the shared frequency spectrum for use in one or more cells in the first radio network that are controlled by a first RRM unit, wherein the occupied first part is in relation to a traffic load in the one or more cells controlled by the first RRM unit; and
    informing a second RRM unit in the second radio network of the first part of the shared frequency spectrum, for the second RRM unit to be free to use the shared frequency spectrum outside the first part in one or more cells controlled by the second RRM.

2. The method of claim 1, further comprising adapting the first part of the shared frequency spectrum in relation to traffic load changes in the one or more cells controlled by the first RRM unit.

3. The method of claim 1, further comprising adapting the first part of the shared frequency spectrum in relation to the traffic load in the one or more cells controlled by the second RRM unit.

4. The method of claim 2, wherein the second RRM unit is informed of any adaptation of the occupied first part of the shared frequency spectrum.

5. The method of claim 3, wherein the first RRM unit is informed of any adaptation of the occupied first part of the shared frequency spectrum.

6. The method of claim 1, wherein a first geographical area covered by the one or more cells controlled by the first RRM unit and a second geographical area covered by the one or more cells controlled by the second RRM unit at least partly overlap.

7. The method of claim 1, wherein the method is performed by the first RRM unit.

8. The method of claim 1, wherein one of the first and second radio networks is a GSM network, and the other of the first and second radio networks is an orthogonal frequency division multiplex network.

9. The method of claim 1, wherein the first and second radio networks use the same radio access technology.

10. A radio resource manager (RRM) unit for controlling radio resource management functions in one or more cells in a first radio network, comprising:
 an interface adapted for connection to a second RRM unit in a second radio network; and
 a device configured to perform a method as defined by claim 1.

11. The RRM unit of claim 10, wherein the interface is adapted for connection to plural RRM units in the second radio network.

12. The RRM unit of claim 10, wherein the RRM unit is included in a base station controller.

13. The RRM unit of claim 10, wherein the RRM unit is included in a radio base station.

14. The RRM unit of claim 12, wherein the base station controller is included in a cellular network.

15. The RRM unit of claim 13, wherein the radio base station is included in a cellular network.

16. A control node, comprising:
 a first interface adapted for a connection over a link to a first radio resource manager (RRM) unit in a first communication network;
 a second interface adapted for a connection over a link to a second RRM unit in a second communication network; and
 a processor adapted to perform a method as defined by claim 1, wherein occupying is based on traffic load measures received at least from the first RRM unit, and the processor is further adapted to inform the first and second RRM units of the occupied first part of the shared frequency spectrum via the first and second interfaces.

* * * * *